United States Patent
Jordan (10) Patent No.: US 11,772,701 B2
(45) Date of Patent: Oct. 3, 2023

(54) ROTATION LIMITATION MODULE AND STEERING WHEEL MODULE FOR A STEER-BY-WIRE STEERING SYSTEM

(71) Applicant: ZF Automotive Germany GmbH, Alfdorf (DE)

(72) Inventor: Martin Jordan, Düsseldorf (DE)

(73) Assignee: F Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/978,718

(22) Filed: Nov. 1, 2022

(65) Prior Publication Data
US 2023/0132966 A1 May 4, 2023

(30) Foreign Application Priority Data

Nov. 2, 2021 (DE) .......................... 102021212303.1

(51) Int. Cl.
*B62D 5/00* (2006.01)
*G05G 5/04* (2006.01)
*B62D 1/04* (2006.01)

(52) U.S. Cl.
CPC .............. *B62D 5/001* (2013.01); *G05G 5/04* (2013.01); *B62D 1/04* (2013.01); *G05G 2700/04* (2013.01)

(58) Field of Classification Search
CPC . B62D 1/04; B62D 1/16; B62D 5/001; B62D 5/005; G05G 5/04; G05G 2700/04; G05G 2700/06; F16H 63/38
See application file for complete search history.

(56) References Cited

U.S. PATENT DOCUMENTS

| | | | | |
|---|---|---|---|---|
| 11,260,897 | B2* | 3/2022 | Fujita | B62D 1/04 |
| 2019/0092373 | A1* | 3/2019 | Nofzinger | B62D 5/006 |
| 2019/0092374 | A1* | 3/2019 | Nofzinger | B62D 5/006 |
| 2021/0245794 | A1* | 8/2021 | Kogure | B62D 6/008 |
| 2023/0109811 | A1* | 4/2023 | Jordan | B62D 6/10 701/41 |
| 2023/0135320 | A1* | 5/2023 | Jordan | B62D 5/001 74/495 |

FOREIGN PATENT DOCUMENTS

| | | |
|---|---|---|
| DE | 102013014134 A1 | 2/2015 |
| KR | 100351406 B1 | 12/2002 |

* cited by examiner

*Primary Examiner* — Adam D Rogers
(74) *Attorney, Agent, or Firm* — Kristin L. Murphy (57) ABSTRACT

Described is a rotation limitation module for a steer-by-wire steering system. Said rotation limitation module comprises a housing in which a shaft portion is received. Furthermore, a limiter disk by way of a sliding guide is coupled in a rotationally fixed manner to the shaft portion and by way of an external thread is driven into an internal thread of the housing. Provided on the housing are detent geometries and on the limiter disk counter-detent geometries which, for limiting a rotation of the shaft portion in a first rotation direction and a second rotation direction, counter to said first rotation direction, are configured for contacting a respectively assigned detent geometry. A steering wheel module for a steer-by-wire steering system, which comprises such a rotation limitation module, is also disclosed.

20 Claims, 5 Drawing Sheets

Fig. 15

ROTATION LIMITATION MODULE AND STEERING WHEEL MODULE FOR A STEER-BY-WIRE STEERING SYSTEM

CROSS-REFERENCE TO RELATED APPLICATION

This application claims priority to German Priority Application No. 102021212303.1, filed Nov. 2, 2021, the disclosure of which is incorporated herein by reference in its entirety.

TECHNICAL FIELD

The disclosure relates to a rotation limitation module for a steer-by-wire steering system, having a housing in which a shaft portion that is rotatable about a central axis and that is able to be coupled in a rotationally fixed manner to a steering wheel shaft or is configured as a portion of the steering wheel shaft is received. The disclosure is also directed toward a steering wheel module for a steer-by-wire steering system, which comprises a steering wheel, which is fastened to a first end of a steering wheel shaft, and a rotation limitation module of the type mentioned at the outset, the rotation limitation module being provided on a second end of the steering wheel shaft that faces away from the steering wheel.

BACKGROUND

Steering wheel modules and rotation limitation modules of this type are known from the prior art. To some extent, the components of steering wheel modules are collectively also referred to as a hand wheel actuator or as a torque feedback unit. However, these terms usually do not include the steering wheel. As also already suggested by these designations, known steering wheel modules are configured, inter alia, for generating a torque which supplies to the driver mechanical feedback in the form of a restoring moment.

Rotation limitation modules are sometimes also referred to as mechanical torque limiters, this being based on the fact that the introduction of a torque into the steering wheel module is limited as a result of the activation of the steering wheel. Accordingly, rotation limitation modules are used in steer-by-wire steering systems in order to limit a rotation of the steering wheel in both rotation directions, said steering wheel in such steering systems no longer being mechanically coupled to a steering gear on the axle. It is ensured in this way, for example, that wiring for electrical systems disposed in the steering wheel is not damaged. Rotation limitation modules are usually configured such that they permit a rotation of the steering wheel in both directions by, for example, 540°, thus 1.5 revolutions. Moreover, rotation limitation modules for safety reasons have to be embodied so that they also function in the event of a failure of an electric power supply.

SUMMARY

What is needed is to further improve known rotation limitation modules and steering wheel modules equipped therewith. A rotation limitation module which is of simple and cost-effective construction is the aim of the disclosure.

A rotation limitation module of the type mentioned at the outset is disclosed, which has a limiter disk which by way of a sliding guide is coupled in a rotationally fixed manner to the shaft portion and has an external thread which is driven into an internal thread of the housing. A housing portion, which delimits the housing in a first axial direction along the central axis, supports a first detent geometry. A housing portion, which delimits the housing in a second axial direction, counter to said first axial direction, along the central axis, supports a second detent geometry. Moreover, provided on a side of the limiter disk that faces the first detent geometry is a first counter-detent geometry, which, for limiting a rotation of the shaft portion in a first rotation direction, is configured for contacting the first detent geometry. Provided on a side of the limiter disk that faces the second detent geometry is a second counter-detent geometry which, for limiting a rotation of the shaft portion in a second rotation direction, counter to the first rotation direction, is configured for contacting the second detent geometry. In one exemplary arrangement, the limiter disk is a singular limiter disk.

The basic concept of the disclosure lies in providing a rotation limitation module having a single limiter disk which is mounted so as to be rotationally fixed but axially displaceable on the shaft portion. Moreover, the limiter disk is guided in the housing by way of a thread. When the shaft portion is now rotated in a first rotation direction, the limiter disk is conjointly rotated and, by virtue of the effect of the thread, displaced in a first axial direction. The limiter disk, more specifically the first counter-detent geometry thereof, in the process runs onto a housing portion, for example, a first detent geometry, when said limiter disk has overcome a predefined maximum distance along the first axial direction. This predefined maximum distance is adapted to a maximum angle of rotation of the shaft portion such that the shaft portion and the steering wheel, which is coupled thereto, are limited in terms of rotation in the first rotation direction. The maximum angle of rotation of the shaft portion here corresponds directly or indirectly to a maximum steering wheel angle. When the shaft portion is rotated in a second rotation direction, counter to the first rotation direction, the limiter disk is likewise conjointly rotated and, by virtue of the effect of the thread, displaced in a second axial direction which is counter to the first axial direction. In this axial direction, the limiter disk, more specifically the second counter-detent geometry thereof, also runs onto a housing portion, more specifically the second detent geometry, when said limiter disk has overcome a predefined maximum distance along the second axial direction. The predefined maximum distance in the second axial direction is also adapted to a maximum permissible angle of rotation, such that a rotation limitation for the shaft portion and the steering wheel, which is coupled thereto, is also implemented in this direction. The maximum angle of rotation of the shaft portion again corresponds directly or indirectly to a maximum steering wheel angle.

The rotation limitation module according to the disclosure comprises only a few components, for example, a few moving components. The coupling between the limiter disk and the shaft portion here is performed by way of a sliding guide which can be produced in a simple and cost-effective manner using standard methods and production plants. The same applies to the coupling between the limiter disk and the housing by way of a thread. The entire rotation limitation module is thus constructed in a simple and cost-effective manner. Moreover, the rotation limitation module is extremely compact. In addition, the rotation limitation module according to the disclosure causes only comparatively little noise during operation. Moreover, the potential noise caused by the rotation of the limiter disk in the thread of the housing is uniform, Noise which a user could perceive as irritating is thus avoided overall. This is particularly true in comparison to known rotation limitation modules in the operation of which a plurality of moving elements have to be successively entrained and numerous mechanical contacts take place before the actual rotation limitation is reached, said mechanical contacts in each case being associated with a noise. Moreover, the limitation module can be adjusted in a simple and precise manner in that a spacing in the axial direction between the limiter disk and the housing-proximal detent geometries is chosen such that a desired maximum angle of rotation for the shaft portion results. The axial displacement which is imparted to the limiter disk by virtue of a relative rotation in relation to the housing in the process can be very easily determined by way of the thread pitch.

In this context, the sliding guide comprises a toothing which runs purely in the axial direction, for example. It is also possible for the sliding guide to be implemented by bevels provided on the shaft portion.

According to one exemplary arrangement, the first detent geometry is configured on an axial protrusion of the associated housing portion that points into the interior of the housing. Alternatively, or additionally, the second detent geometry is configured on an axial protrusion of the associated housing portion that points into the interior of the housing. Alternatively, or additionally, the first counter-detent geometry is configured on an axial protrusion of the limiter disk. Alternatively, or additionally, the second counter-detent geometry is configured on an axial protrusion of the limiter disk. In other words, at least one detent geometry is configured on an axial protrusion of the associated housing portion, or at least one counter-detent geometry is configured on an axial protrusion of the limiter disk. The at least one detent geometry and/or the at least one counter-detent geometry can thus be produced with high precision. Moreover, the provision of an axial protrusion has the effect that the rotation limitation module can be easily rotated back from an operating situation in which a counter-detent geometry contacts the assigned detent geometry. In other words, it is avoided in this way that the limiter disk is undesirably jammed or braced in the housing.

The axial protrusion that supports the first detent geometry and/or the axial protrusion that supports the second detent geometry and/or the axial protrusion that supports the first counter-detent geometry and/or the axial protrusion that supports the second counter-detent geometry in the circumferential direction here can extend across 45 angular degrees or less. In one exemplary arrangement, the extent is across 30 angular degrees or less. The axial protrusions are thus embodied in a comparatively compact manner such that an overall compact construction of the rotation limitation module results.

It is also possible for the axial protrusion that supports the first detent geometry and/or the axial protrusion that supports the second detent geometry and/or the axial protrusion that supports the first counter-detent geometry and/or the axial protrusion that supports the second counter-detent geometry in the radial direction to be at least 1.5 mm in length. In one exemplary arrangement, the axial protrusion is at least 3 mm in length. Installation space in the radial direction is thus utilized for a sufficiently large design of the detent geometry and/or the counter-detent geometry. In this way, mechanical stresses in the housing and/or the limiter disk can be kept to a low level. The installation space in the radial direction here is usually less critical, i.e. typically available, in comparison to installation space in the axial direction. The installation spaces available are thus cleverly utilized by the rotation limitation module according to the disclosure.

In one alternative arrangement, the axial protrusion that supports the first detent geometry is furthermore configured so as to be integral to the associated housing portion. Alternatively or additionally, the axial protrusion that supports the second detent geometry is configured so as to be integral to the associated housing portion. In this way, the detent geometries can be produced in a cost-effective manner. Assembling the detent geometries on the housing is consequently not necessary.

The axial protrusion that supports the first counter-detent geometry can moreover be configured so as to be integral to the limiter disk, or be provided on a detent component that is held so as to be elastically displaceable on the limiter disk. Alternatively or additionally, the axial protrusion that supports the second counter-detent geometry can be configured so as to be integral to the limiter disk, or be provided on a detent component which is held so as to be elastically displaceable on the limiter disk. The integral exemplary arrangement of the counter-detent geometries has the advantage that the limiter disk, including the counter-detent geometries, can be produced in a simple and cost-effective manner. No assembly operations are obviously required. In comparison, providing the counter-detent geometries on a detent component has the advantage that the detent can be provided with a damping characteristic such that the user experiences a comparatively soft rotation limitation.

In the case of both counter-detent geometries being provided on a detent component, a common detent component which supports both counter-detent geometries can be used. A simple construction results in this way.

In one exemplary arrangement, the first detent geometry and/or the second detent geometry and/or the first counter-detent geometry and/or the second counter-detent geometry are/is configured as detent faces. This has the advantage that the forces which are transmitted during contact between mutually assigned detent geometries and counter-detent geometries result in only comparatively minor mechanical stresses in the assigned components. The mutually assigned detent geometries and counter-detent geometries thus bear on one another in a planar manner. In this way, the forces which are to be transmitted when a detent is contacted are distributed in the detent face. As a result, the rotation limitation module has a comparatively high level of reliability and a comparatively long service life.

In one exemplary arrangement, the detent faces are substantially flat.

The first detent geometry and/or the second detent geometry and/or the first counter-detent geometry and/or the second counter-detent geometry in terms of the central axis can be oriented substantially in the circumferential direction. A geometry which is oriented in the circumferential direction here is understood to mean that a normal points in the circumferential direction. In the case of the detent geometries and/or the counter-detent geometries being configured as flat detent faces, the latter thus extend in the axial direction and in the radial direction. The limiter disk thus impacts the respectively relevant housing portion in the circumferential direction, Jamming or bracing of the rotation limitation module is avoided in this way. The limiter disk and the shaft portion can thus also be easily rotated back from a detent situation.

When viewed in the radial direction, a first axial spacing between the housing portion, which supports the first detent geometry, and the limiter disk, and a second axial spacing between the housing portion, which supports the second detent geometry, and the limiter disk are chosen such that the end sides of the respective axial protrusion do not impact the housing, the housing lid and the limiter disk in the event of maximum rotation. In this way, these axial spacings depend on the angle of rotation required.

In one exemplary arrangement, the first axial spacing and the second axial spacing in cumulative terms are greater than or equal to a pitch of the external thread of the limiter disk. Furthermore, the first axial spacing and the second axial spacing in cumulative terms are greater than or equal to 1.5 times a pitch of the external thread of the limiter disk. Since the external thread of the limiter disk is driven into an internal thread of the housing, the same naturally also applies to the internal thread. A pitch of a thread here is understood to mean the axial distance traveled as a result of one revolution. This corresponds to an axial spacing between two crests of the thread. The pitch of a thread is in some instances also referred to as the lead. The axial spacings here are in each case determined as the spacings of mutually closest points of the respective housing portion and of the limiter disk. The axial protrusions that support the detent geometries and counter-detent geometries thus potentially have the effect of reducing the spacing. The angle of rotation permitted by the rotation limitation module can be adjusted by way of the axial spacings. In one exemplary arrangement in which a detent geometry and/or a counter-detent geometry are/is not provided on the entire circumference, it has to be additionally taken into account here, however, that the counter-detent geometry in a certain way can plunge into the assigned housing portion such that an axial spacing of zero is not equivalent to an impact on the detent. An axial protrusion that supports a detent geometry, and an assigned axial protrusion that supports a counter-detent geometry, can thus still be rotatable relative to one another even in an operating state in which said axial protrusions overlap in the axial direction. In the event that the cumulative axial spacings correspond to a pitch of the thread, the limiter disk, proceeding from a center position, can thus perform half a revolution in each direction before the respective counter-detent geometry in the axial direction potentially plunges into the associated housing portion. For determining the actual detent, it is additionally to be considered how far the limiter disk in the plunged state can be rotated in relation to the assigned housing portion.

In one exemplary arrangement, at least an axial end side of the limiter disk or an axial end side of the housing portion that supports the first detent geometry, or an axial end side of the housing portion that supports the second detent geometry, at least in portions are/is covered by an elastically deformable shock-absorbent material. In this way, a rotation limitation is perceived to be soft by a user. Said user, when rotating the steering wheel, senses a gradually increasing resistance before any further rotation is no longer possible. The shock-absorbent material is, for example, an elastomer material.

Moreover, the housing portion that supports the first detent geometry can be a housing lid that axially closes the housing. Alternatively, or additionally, the housing portion that supports the second detent geometry can be a housing lid that axially doses the housing. In this context, axial dosing does not preclude the presence of a defined opening, the shaft portion extending through the latter, for example. Such a configuration has the effect that the rotation limitation module can be constructed from comparatively few components.

A steering wheel module of the type mentioned at the outset is also disclosed, in which the rotation limitation module is embodied as a rotation limitation module according to the disclosure. By virtue of the fact that the rotation limitation module is of simple and compact construction, the steering wheel module overall is also of simple and compact construction. Moreover, a steering wheel module of this type can be operated while emitting comparatively little noise.

Furthermore, the effects and advantages discussed in the context of the rotation limitation module according to the disclosure also apply to the steering wheel module according to the disclosure.

BRIEF DESCRIPTION OF DRAWINGS

The disclosure will be explained hereunder by various exemplary arrangements that are shown in the appended drawings, in which.

DETAILED DESCRIPTION

Figure 1:
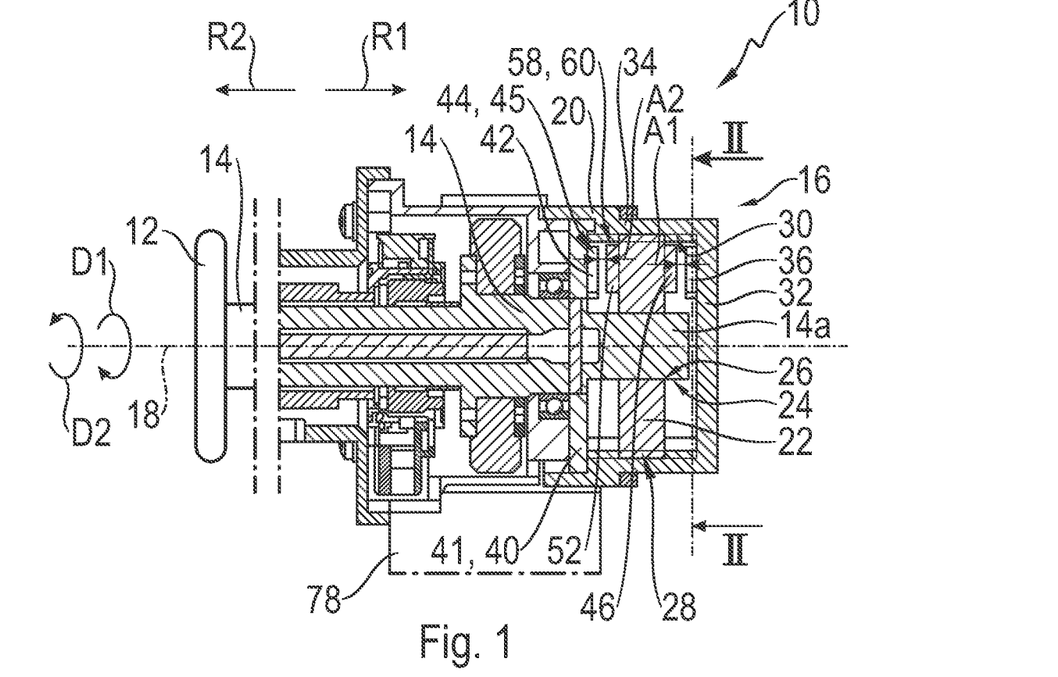
FIG. 1 shows a steering wheel module according to the disclosure, having a rotation limitation module according to the disclosure and according to a first exemplary arrangement, in a longitudinal sectional illustration.

FIG. 1 shows a steering wheel module 10 for a steer-by-wire steering system.

The steering wheel module 10 comprises a steering wheel 12 which is only schematically illustrated and is fastened to a first end of a steering wheel shaft 14, and a rotation limitation module 16 according to a first exemplary arrangement, which is provided on a second end of the steering wheel shaft 14 that faces away from the steering wheel 12.

The steering wheel 12, conjointly with the steering wheel shaft 14, is rotatable about a central axis 18.

The task of the rotation limitation module 16 lies in limiting a rotation of the steering wheel 12 and of the steering wheel shaft 14 connected to the former in both directions.

To this end, the rotation limitation module 16 has a housing 20 in which a shaft portion 14a of the steering wheel shaft 14 is received.

Furthermore provided is a limiter disk 22.

The latter is coupled in a rotationally fixed manner to the shaft portion 14a by way of a sliding guide 24. The limiter disk 22 can thus be displaced along the central axis 18 in relation to the shaft portion 14a, but cannot be rotated in relation to the shaft portion 14a.

Figure 2:
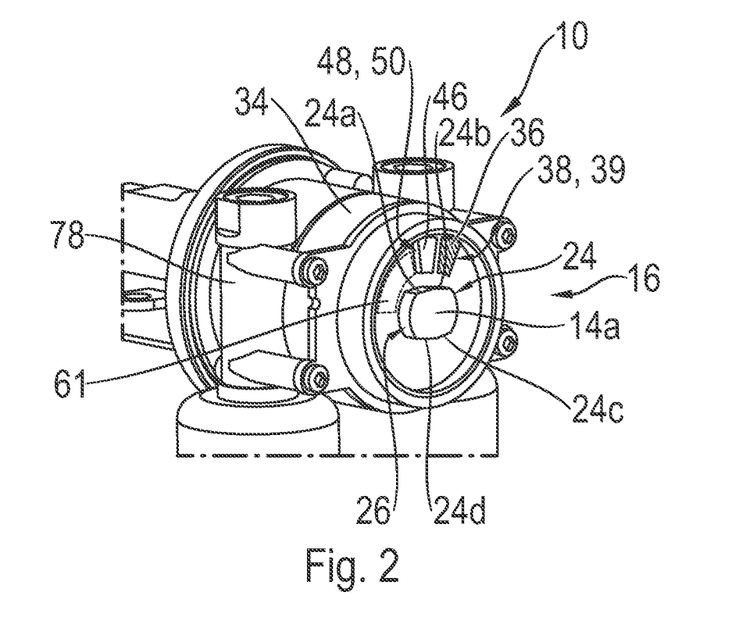
FIG. 2 shows the steering wheel module from FIG. 1 in a sectional view along the plane II-II in FIG. 1.

In the exemplary arrangement illustrated, the sliding guide 24 on the shaft comprises a total of four bevels 24a, 24b, 24c, 24d. An opening 26, which is provided in the limiter disk 22 and into which the shaft portion 14a is inserted, is designed in a complementary manner.

The limiter disk 22 on the external circumference thereof moreover has an external thread 28 which is driven into an internal thread 30 provided on an internal circumference of the housing 20.

Both the external thread 28 and the internal thread 30 run completely in a circumferential manner.

Furthermore, the internal thread 30 extends substantially across the entire axial length of the housing 20.

The two threads in the exemplary arrangement illustrated are metric threads of the size M60. An associated thread pitch is 1 mm or 1.5 mm. These values are examples.

If the shaft portion 14a is rotated by virtue of an activation of the steering wheel 12, the limiter disk 22 is thus repositioned in the axial direction.

In order for a rotation in a first rotation direction D1 to be limited, an axial protrusion 36, substantially in the shape of an angular segment, is provided on a housing portion 32, the latter delimiting the housing 20 in a first axial direction R1 and in the exemplary arrangement illustrated being embodied so as to be integral to a housing casing part 34 (see also FIG. 2).

The axial protrusion 36 is produced so as to be integral to the housing portion 32.

Furthermore, the axial protrusion 36 points into the interior of the housing 20.

The axial protrusion 36 here extends substantially across 10 angular degrees.

Moreover, said axial protrusion 36 has a length of approx. 10 mm measured in the radial direction.

Said axial protrusion 36 has a height measured in the axial direction of approx. 1 mm.

Moreover, a circumferential face of the axial protrusion 36 that points counter to the rotation direction D1 to be limited is configured as a detent geometry 38 which in the exemplary arrangement illustrated is a substantially flat detent face 39.

In order fora rotation of the shaft portion 14a in a second rotation direction D2, counter to the first rotation direction D1, to be limited, a second axial protrusion 42 is provided on a housing portion 40 that delimits the housing 20 in a second axial direction R2.

The second axial direction R2 here is counter to the first axial direction R1.

The housing portion 40 along the central axis 18 is thus opposite the housing portion 32.

In the exemplary arrangement illustrated, the housing portion 40 is embodied as a housing lid 41 that axially closes the housing 20, and the axial protrusion 42 is provided so as to be integral to the housing lid 41.

The second axial protrusion 42 is also substantially in the shape of an angular segment. The design of said second axial protrusion 42 here corresponds to the design of the first axial protrusion 36.

The axial protrusion 36 thus likewise points into the interior of the housing 20.

Said axial protrusion 36 also extends substantially across 10 angular degrees.

Furthermore, said axial protrusion 36 has a length of approx. 10 mm measured in the radial direction.

The height of said axial protrusion 36 measured in the axial direction is approx. 1 mm.

A detent geometry 44, which in the exemplary arrangement illustrated is a substantially flat detent face 45, is moreover configured on a circumferential face of the axial protrusion 42 that points counter to the second rotation direction D2 to be limited.

The detailed design of the axial protrusions 36, 42 and of the detent faces 39, 45 provided on the latter is also apparent in FIGS. 9 to 12. These figures are however directed toward another embodiment of the rotation limitation module 16, but there are no differences in terms of the design of the axial protrusions 36, 42.

A further axial protrusion 46 is provided on a side of the limiter disk 22 that faces the first detent geometry 38.

In one exemplary arrangement, the axial protrusion 46 is embodied so as to be integral to the limiter disk 22.

Like the axial protrusions 36, 42 already explained, the axial protrusion 46 is also substantially in the shape of an angular segment. The design of said axial protrusion 46 here corresponds to the design of the axial protrusions 36 and 42.

The axial protrusion 46 thus also extends substantially across 10 angular degrees.

Furthermore, said axial protrusion 46 has a length of approx. 10 mm measured in the radial direction.

The height of said axial protrusion 46 measured in the axial direction is approx. 1 mm.

A first counter-detent geometry 48, which in the exemplary arrangement illustrated is a substantially flat detent face 50, is moreover configured on a circumferential face of the axial protrusion 46 that points in the direction of the rotation direction D1 to be limited.

The first counter-detent geometry 48, for limiting a rotation of the shaft portion 14a in the first rotation direction D1, is configured for contacting the first detent geometry 38.

In other words, the detent faces 39 and 50 are configured for contacting each other when the limiter disk 22, by virtue of a rotation of the shaft portion 14a, moves to the right in FIG. 1. In this case, the detent faces 39 and 50 come to bear on each other in a planar manner.

It is understood here that both detent faces 39, 50 are oriented in the circumferential direction, i.e. that a respective surface normal points in the circumferential direction. The detent faces 39, 50 per se thus extend in the axial direction and the radial direction.

An axial protrusion 52 is also provided on a side of the limiter disk 22 that faces the second detent geometry 44.

In one exemplary arrangement, the axial protrusion 52 is likewise embodied so as to be integral to the limiter disk 22.

The design of said axial protrusion 52 here corresponds to the design of the axial protrusion 46. Furthermore, the axial protrusion 52 along the central axis 18 lies exactly opposite the axial protrusion 46.

Said axial protrusion 52 thus also extends substantially across 10 angular degrees.

Furthermore, said axial protrusion 52 has a length of approx. 10 mm measured in the radial direction.

The height of said axial protrusion 52 measured in the axial direction is approx. 1 mm.

A second counter-detent geometry 58, which in the exemplary arrangement illustrated is a substantially flat detent face 60, is moreover configured on a circumferential face of the axial protrusion 52 that points in the direction of the rotation direction to be limited.

The second counter-detent geometry 58, for limiting a rotation of the shaft portion 14*a* in the second rotation direction D2, is configured for contacting the second detent geometry 44.

In other words, the detent faces 45 and 60 are configured for contacting each other when the limiter disk 22, by virtue of a rotation of the shaft portion 14*a*, moves to the left in FIG. 1. In this instance, the detent faces 45 and 60 come to bear on each other in a planar manner.

The two detent faces 45, 60 are also oriented in the circumferential direction, i.e. a respective surface normal points in the circumferential direction. The faces per se thus extend in the axial direction and the radial direction.

Figure 13:
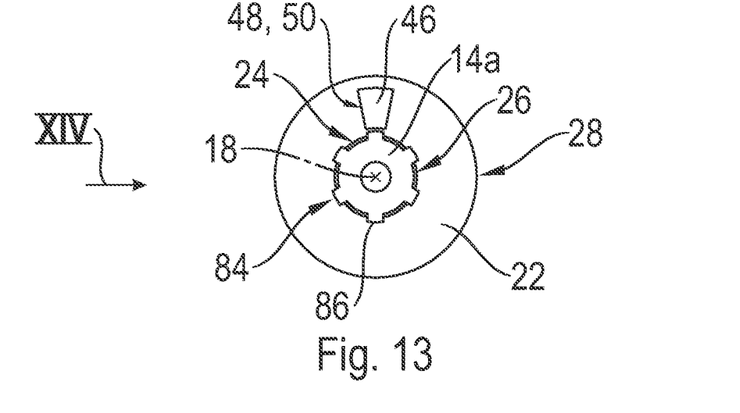
FIG. 13 shows an alternative sliding guide which can be used in combination with all above-mentioned exemplary arrangements of the rotation limitation module.
Figure 14:
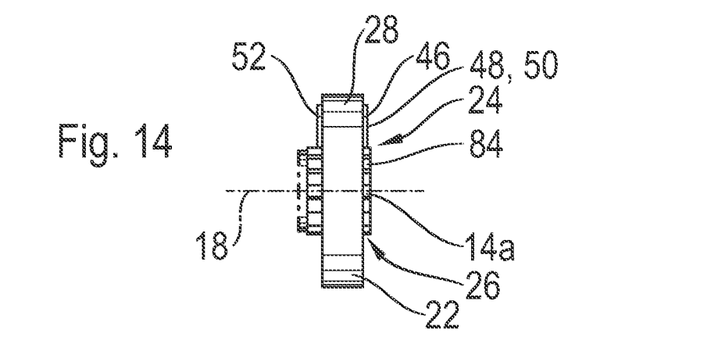
FIG. 14 shows a view of the sliding guide from FIG. 13 along the direction XIV from FIG. 13.

The detailed design of the axial protrusions 46, 52 and of the detent faces 50, 60 provided thereon is also apparent in FIGS. 13 to 14. The limiter disk 22 shown in these figures here differs from the limiter disk 22 of the rotation limitation module 16 according to the first exemplary arrangement only in terms of the sliding guide 24. There are thus no differences in terms of the design of the axial protrusions 46, 52.

The limiter disk 22 in FIG. 1 is illustrated in a central position which is distinguished in that a first axial spacing A1, between the limiter disk 22 and the housing portion 32 that supports the first detent geometry 38, and a second axial spacing A2, between the limiter disk 22 and the housing portion 40 that supports the second detent geometry 44, are identical.

As is evident in FIG. 1, the axial spacings A1, A2 are measured so as to proceed from the axial end faces of the axial protrusions 36, 46, 42, 52. The smallest spacing between the limiter disk 22 and the assigned housing portions 32, 40 is thus relevant.

The central position of the limiter disk 22 preferably also corresponds to a central position of the steering wheel 12, which corresponds to an assigned vehicle traveling straight ahead.

A measure by which the shaft portion 14*a* can be rotated in the first rotation direction D1 is thus the sum of an angle of rotation which is required to overcome the spacing A1 and of an angle of rotation which the axial protrusion 46 upon overcoming the axial spacing A1, in a state plunged into the housing portion 32 so to speak, can still perform before the detent faces 39 and 50 contact each other.

The same applies to the second rotation direction D2.

A measure by which the shaft portion 14*a* can be rotated in the second rotation direction accordingly is the sum of an angle of rotation that is required to overcome the axial spacing A2 and of an angle of rotation that the axial protrusion 52 upon overcoming the spacing A2, in a state plunged into the housing portion 40 so to speak, can perform before the detent faces 45 and 60 contact each other.

Consequently, an angle of rotation permitted by the rotation limitation module 16 can be adjusted by selecting the size of the axial spacings A1, A2, on the one hand, and by selecting the respective angle of rotation in the plunged state, on the other hand.

The axial spacings A1 and A2 here can be adjusted by the axial relative positioning of the limiter disk 22 in relation to the housing portions 32, 40.

The angles of rotation in the plunged state are a function of a relative rotary position of the detent face 39 in relation to the detent face 50, and of the detent face 45 in relation to the detent face 60, this being present in a situation in which the respectively relevant axial spacing A1, A2 is zero.

This rotary position can be adjusted by a suitable rotary positioning of the housing portions 32, 40.

The housing portion 32 in the exemplary arrangement illustrated here is embodied so as to be integral to the housing casing part 34 such that no relative movement between the housing portion 32 and the housing casing part 34 is possible in this context. However, the housing portion 40, which is embodied as a housing lid 41, can be established in a suitable rotary position on the housing casing part 34.

The pitch of the external thread 28 and of the internal thread 30 is relevant when an angle of rotation of the shaft portion 14*a* is converted into an axial displacement of the limiter disk 22.

In the exemplary arrangement illustrated, the rotation limitation module 16 is configured such that, when viewed in the radial direction, the first axial spacing A1 and the second axial spacing A2 in cumulative terms correspond to a pitch of the external thread 28 of the limiter disk 22.

Proceeding from a central position, the shaft portion 14*a* can thus be rotated by in each case half a revolution in both directions until the respective axial protrusion 46, 52 begins to plunge into the respectively assigned housing portion 32, 40.

Furthermore, the detent faces 39, 50 and 45, 60 in rotary terms are in each case positioned relative to one another in such a way that a rotation of approx. 270° is still possible once plunging has taken place.

Such a rotation limitation module 16 overall thus limits a rotation to in each case approx. 450° i.e. 125 revolutions, in both directions.

It is understood here that the dimensional specifications mentioned above, either spacings or angles, serve only for easier explanation and on no account are to be considered limiting.

In one variant of the first exemplary arrangement, the housing portion 32 is not embodied so as to be integral to the housing casing part 34 but is likewise implemented by a housing lid that axially delimits the housing 20.

In this context, such a housing lid may be connected to the housing casing part 34 by friction welding to a precise angle, this yet to be explained later in connection with FIG. 15.

In order for the impacting action of the detent faces 39, 50 and 45, 60 to be damped, at least an axial end side of the limiter disk 22, or an axial end side of the housing portion 32 that supports the first detent geometry 38, or an axial end side of the second housing portion 40 that supports the second detent geometry 44, at least in portions can moreover be covered with an elastically deformable shock-absorbent material 61. In this context, a shock-absorbent material 61 of this type, which is compressed in the axial direction before the detent faces 39, 50 impact each other, is plotted in a purely exemplary manner in FIG. 2.

Figure 3:
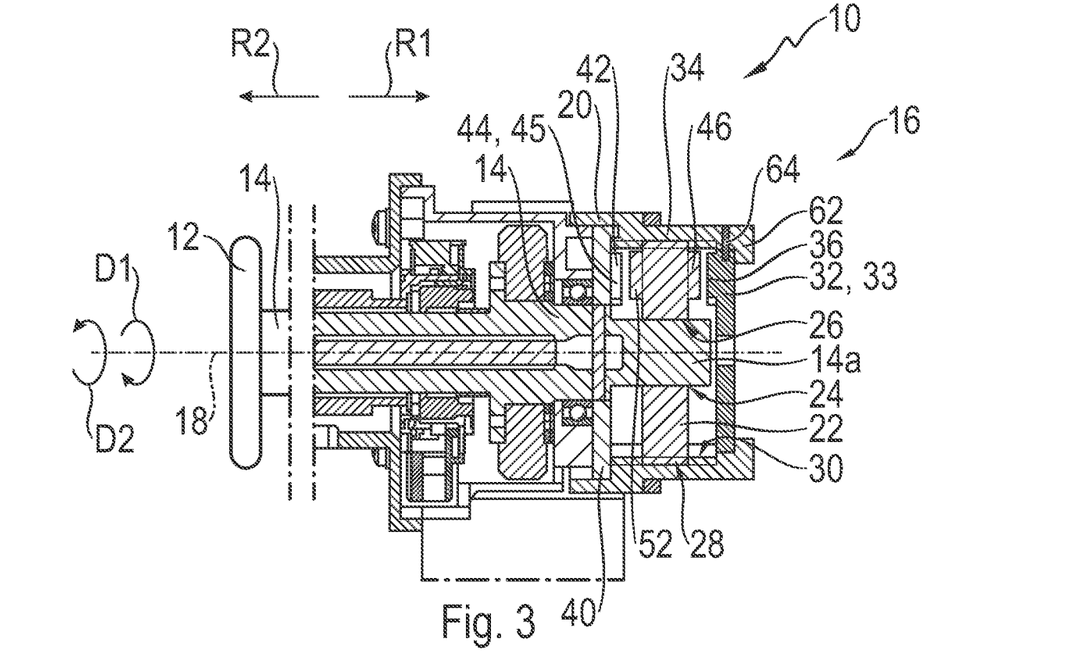
FIG. 3 shows a steering wheel module according to the disclosure having a rotation limitation module according to the disclosure and according to a second exemplary arrangement, in a longitudinal sectional illustration.

Shown in FIG. 3 is a steering wheel module 10 in which the rotation limitation module 16 is designed according to a second exemplary arrangement.

Only the points of differentiation in comparison to the first exemplary arrangement will be discussed here. Identical or functionally equivalent components have the same reference signs.

The second exemplary arrangement differs from the first exemplary arrangement only in terms of the housing portion 32.

In the second exemplary arrangement here, the housing portion 32 is embodied as a housing lid 33 that axially delimits the housing 20.

In order for the housing lid 33 to be held on the housing casing part 34, the axial peripheral region 62 of the latter is folded radially inward.

Moreover, the housing lid 33 in rotary terms is positioned on the housing casing part 34 by a pin 64 such that the adjustment possibilities in terms of the permissible angle of rotation explained in detail above continue to be maintained.

A steering wheel module 10 having a rotation limitation module 16 according to a third exemplary arrangement is illustrated in FIGS. 4 to 12.

Only the points of differentiation in comparison to the first exemplary arrangement will again be discussed. Identical or functionally equivalent components are again provided with the same reference signs.

Figure 4:
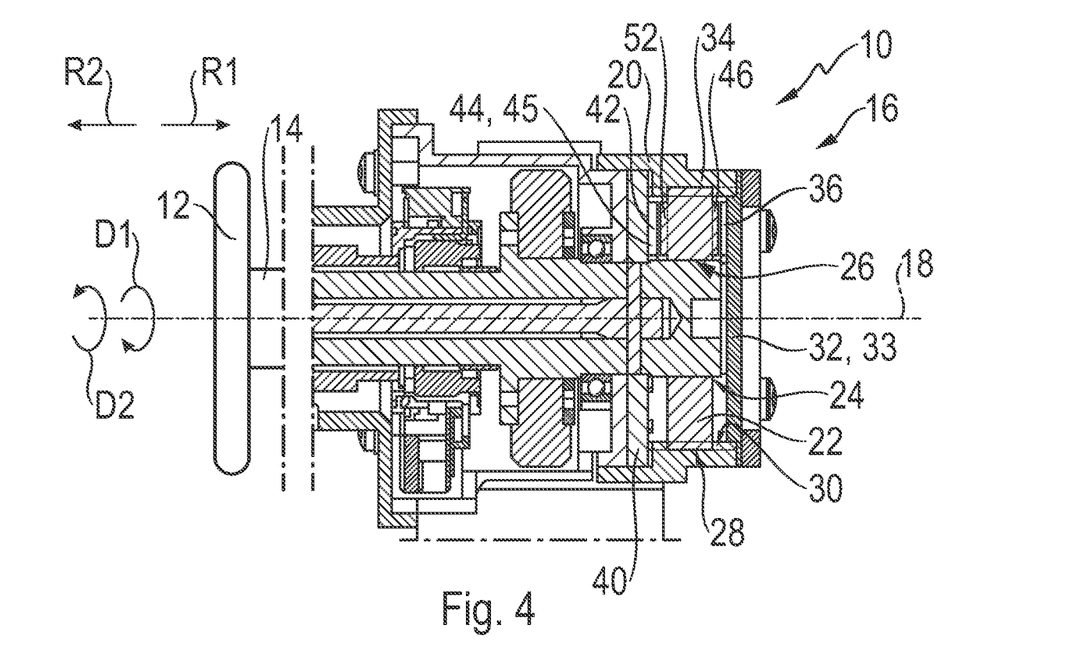
FIG. 4 shows a steering wheel module according to the disclosure having a rotation limitation module according to the disclosure and according to a third exemplary arrangement, in a longitudinal sectional illustration.
Figure 5:
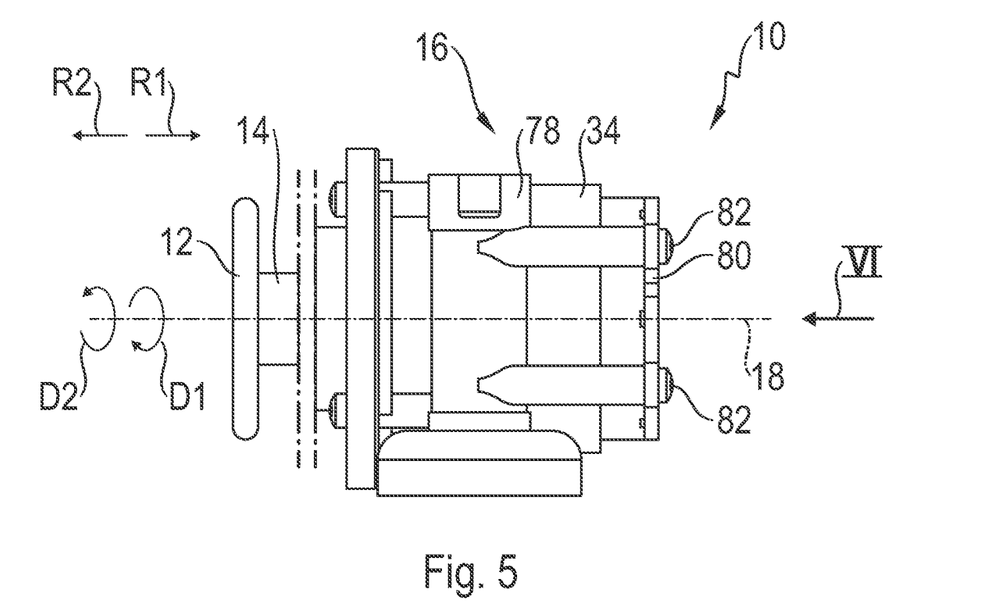
FIG. 5 shows the steering wheel module from FIG. 4 in a lateral view.
Figure 6:
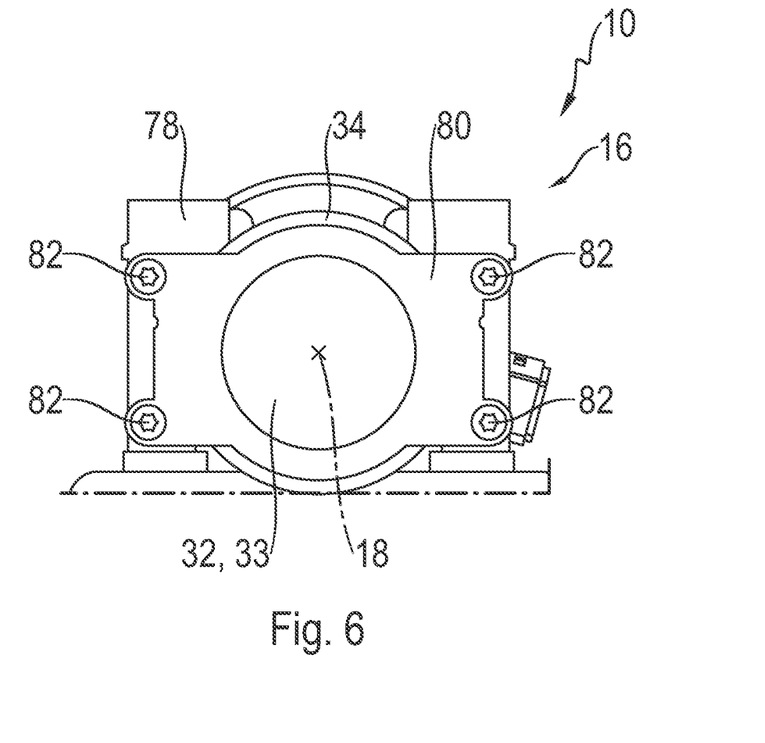
FIG. 6 shows the steering wheel module from FIGS. 4 and 5 in a view along the direction VI in FIG. 5.

In the rotation limitation module 16 according to the third exemplary arrangement, the first housing portion 32 and the second housing portion 40 are in each case embodied as a housing lid 33, 41 that delimits the housing 20 in the axial direction.

Figure 10:
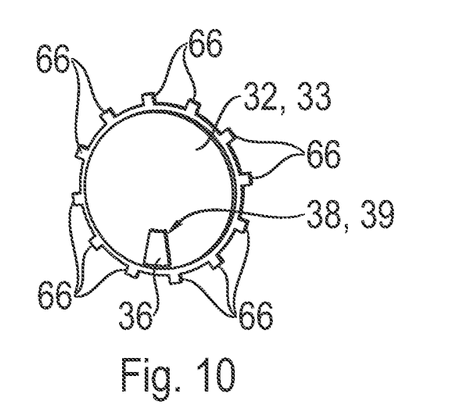
FIG. 10 shows a first housing portion of the rotation limitation module from FIGS. 4 to 6, said first housing portion being embodied as a housing lid, in a stand-alone illustration.
Figure 11:
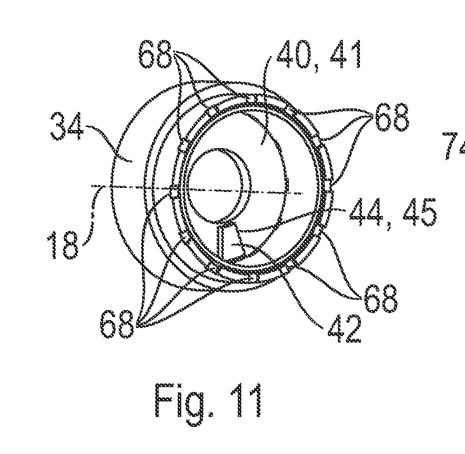
FIG. 11 shows a sub-module of the rotation limitation module from FIGS. 4 to 6, which comprises the second housing portion from FIG. 9 and the housing casing part from FIGS. 7 and 8.
Figure 12:
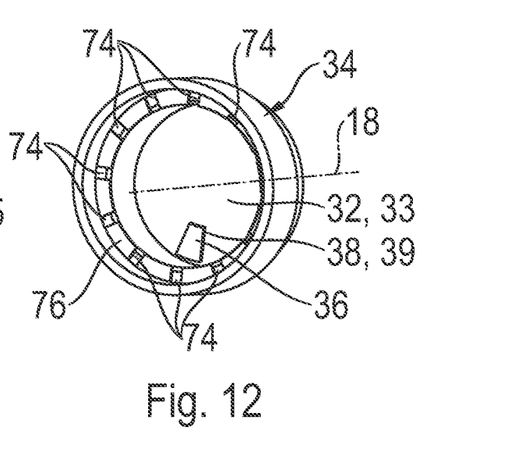
FIG. 12 shows a sub-module of the rotation limitation module from FIGS. 4 to 6, which comprises the first housing portion from FIG. 10 and the housing casing part from FIGS. 7 and 8.

In order to be able to position the housing lid 33 at a precise angle on the housing casing part 34, said housing lid 33 is provided with positioning cams 66 which project in a substantially radial manner (see in particular FIG. 10).

Figure 7:
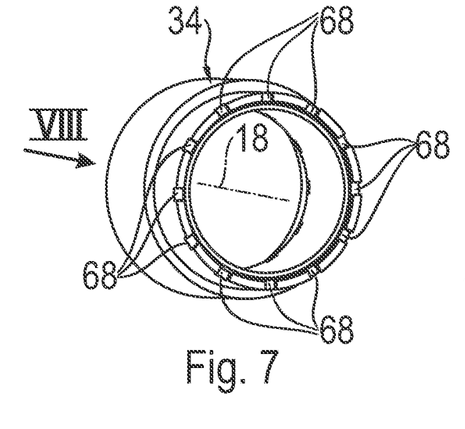
FIG. 7 shows a housing casing part of the rotation limitation module from FIGS. 4 to 6 in a stand-alone illustration in a view along the direction VII from FIG. 8.
Figure 8:
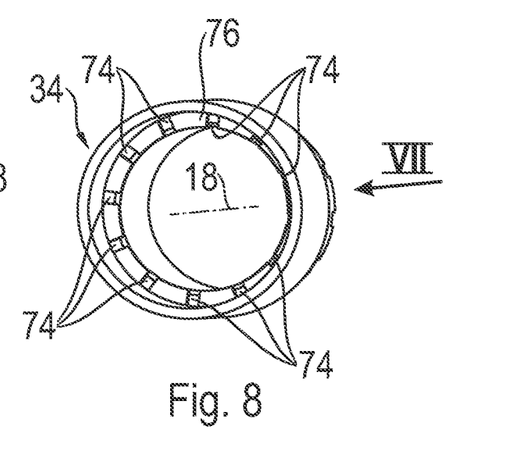
FIG. 8 shows the housing casing part from FIG. 7 in a view along the direction VIII from FIG. 7.

To this end, complementary depressions 68 are configured on the housing casing part 34.

In this way, the housing lid 33 is always assembled on the housing casing part 34 in such a way that the positioning cams 66 engage in each case in an assigned depression 68.

In the exemplary arrangement illustrated, the housing lid 33 has a total of twelve positioning cams 66 such that an angular pattern of 30° results.

Figure 9:
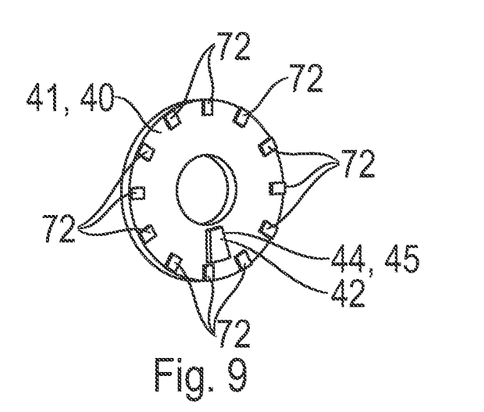
FIG. 9 shows a second housing portion of the rotation limitation module from FIGS. 4 to 6, said second housing portion being embodied as a housing lid, in a stand-alone illustration.

Positioning cams 72, which, however, extend substantially in the axial direction, are likewise formed on the housing lid 41. Depressions 74, which are formed on a shoulder 76, are assigned to said positioning cams 72 on the housing casing part 34.

The housing lid 41 is thus always positioned on the housing casing part 34 in such a way that each of the positioning cams 72 engages in an assigned depression 74.

A total of twelve positioning cams 72 are also provided on the housing lid 41 such that an angular pattern of 30° results again.

The previously explained angles of rotation of the shaft portion 14a made possible in the first rotation direction D1 and the second rotation direction D2, for example in terms of those proportions of angles of rotation that are still possible after the plunging of the axial protrusions 46, 52, can thus be adjusted by positioning the housing lids 33, 41 in terms of rotation by the positioning cams 66, 72.

The housing 20 of the rotation limitation module 16 thus adjusted is then placed onto a housing 78 of the steering wheel module 10 and fastened thereto by means of a holding plate 80.

In the exemplary arrangement illustrated, the holding plate 80 is fixed to the housing 78 by a plurality of screws 82.

An alternative exemplary arrangement of the sliding guide 24 is shown in FIGS. 13 and 14.

Instead of the bevels 24a, 24b, 24c, 24d (cf. FIG. 2 an axial toothing 84 is provided on the shaft portion 14a. The opening 26 on the limiter disk 22 is provided with grooves 86 which are configured and disposed in a manner complementary to said axial toothing 84. In this way, the limiter disk 22 can also be connected in a rotationally fixed manner to the shaft portion 14a and at the same time remain axially displaceable.

Figure 15:
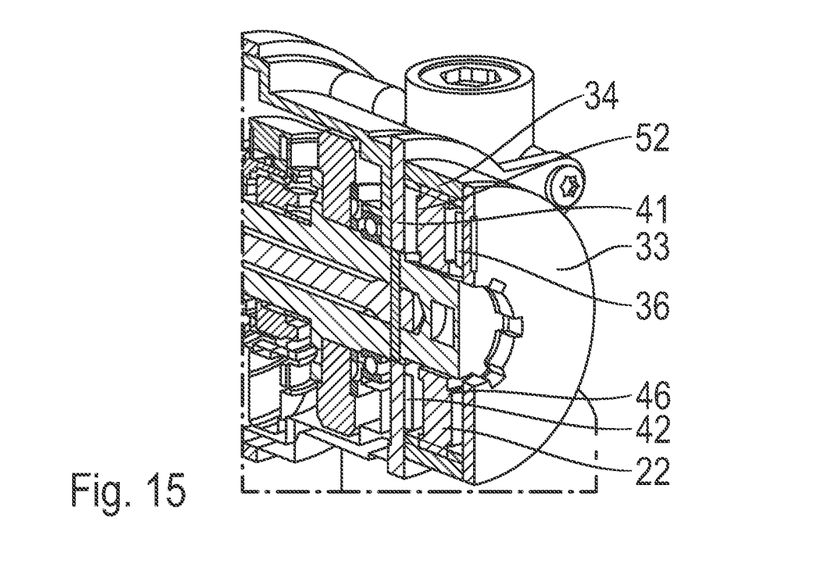
FIG. 15 shows a perspective sectional view through a steering module according to the disclosure, in which the housing is friction-welded.

An exemplary arrangement in which the housing lids 33, 41 are configured as disks, which are fastened to the housing casing part 34 by friction welding, is shown in FIG. 15. These components can thus be designed and assembled in a very simple and cost-effective manner, and do not have any radial toothings. The compactness is also highly distinctive in this variant. Assembling here can also very easily take place in an automated manner.

The welded locations are provided on the two opposite end sides of the housing casing part 34.

The housing lids 23, 31 and the limiter disk 22 can be produced from a cold-formed strip of sheet metal, this representing one option.

The housing lids 23, 31 may have contours which simplify and improve assembling, on the one hand, and friction welding, on the other hand.

The rotating procedure during friction welding has to be terminated in a targeted manner, and it has to be achieved specifically that the axial protrusions 36, 46 are at the correct circumferential position in relation to the threads, since said axial protrusions 36, 46 define the terminal detent.

Insulation seals, which can act as terminal detent dampers between the end sides of the axial protrusions 36, 46 and 42, 52, can be additionally provided.

The central opening shown in the housing lid 33 can also be omitted, this preventing an ingress of dirt.

The invention claimed is:
1. A rotation limitation module for a steer-by-wire steering system, comprising:
a housing in which a shaft portion that is rotatable about a central axis and that is able to be coupled in a rotationally fixed manner to a steering wheel shaft or is configured as a portion of the steering wheel shaft, and
a limiter disk which by way of a sliding guide is coupled in a rotationally fixed manner to the shaft portion and has an external thread which is driven into an internal thread of the housing,
a housing portion, which delimits the housing in a first axial direction along the central axis, supporting a first detent geometry, and a housing portion, which delimits the housing in a second axial direction, counter to said first axial direction, along the central axis, supporting a second detent geometry, and
a first counter-detent geometry, which, for limiting a rotation of the shaft portion in a first rotation direction, is configured for contacting the first detent geometry, being provided on a side of the limiter disk that faces the first detent geometry, and a second counter-detent geometry, which for limiting a rotation of the shaft portion in a second rotation direction, counter to the first rotation direction, is configured for contacting the second detent geometry, being provided on a side of the limiter disk that faces the second detent geometry.

2. The rotation limitation module as claimed in claim 1, wherein
the first detent geometry is configured on an axial protrusion of the associated housing portion that points into an interior of the housing.

3. The rotation limitation module as claimed in claim 2, wherein the axial protrusion that supports the first detent geometry extends across 45 angular degrees or less.

4. The rotation limitation module as claimed in claim 2, wherein the axial protrusion that supports the first detent geometry in a radial direction is at least 1.5 mm in length.

5. The rotation limitation module as claimed in claim 2, wherein the axial protrusion that supports the first detent geometry is configured so as to be integral to the associated housing portion.

6. The rotation limitation module as claimed in claim 2, wherein the axial protrusion that supports the first counter-detent geometry is configured so as to be integral to the limiter disk, or is provided on a detent component that is held so as to be elastically displaceable on the limiter disk.

7. The rotation limitation module as claimed in claim 1, wherein the first detent geometry and/or the second detent geometry and/or the first counter-detent geometry and/or the second counter-detent geometry are/is configured as detent faces.

8. The rotation limitation module as claimed in claim 1, wherein the first detent geometry and/or the second detent geometry and/or the first counter-detent geometry and/or the second counter-detent geometry in terms of the central axis are oriented substantially in a circumferential direction.

9. The rotation limitation module as claimed in claim 1, wherein, when viewed in a radial direction, a first axial spacing between the housing portion, which supports the first detent geometry, and the limiter disk, and a second axial spacing between the housing portion, which supports the second detent geometry, and the limiter disk in cumulative terms are greater than or equal to a pitch of the external thread of the limiter disk.

10. The rotation limitation module as claimed in claim 1, wherein at least an axial end side of the limiter disk, or an axial end side of the housing portion that supports the first detent geometry, covered by an elastically deformable shock-absorbent material.

11. The rotation limitation module as claimed in claim 1, wherein the housing portion that supports the first detent geometry is a housing lid that axially closes the housing.

12. A steering wheel module for a steer-by-wire steering system, having a steering wheel, which is fastened to a first end of a steering wheel shaft, and a rotation limitation module as claimed in claim 1, wherein the rotation limitation module is provided on a second end of the steering wheel shaft that faces away from the steering wheel.

13. The rotation limitation module as claimed in claim 1, wherein
the first counter-detent geometry is configured on an axial protrusion of the limiter disk.

14. The rotation limitation module as claimed in claim 1, wherein
the second counter-detent geometry is configured on an axial protrusion of the limiter disk.

15. The rotation limitation module as claimed in claim 1, wherein
the second detent geometry is configured on an axial protrusion of the associated housing portion that points into an interior of the housing.

16. The rotation limitation module as claimed in claim 15, wherein the axial protrusion that supports the second detent geometry is configured so as to be integral to the associated housing portion.

17. The rotation limitation module as claimed in claim 15, the axial protrusion that supports the second counter-detent geometry is configured so as to be integral to the limiter disk, or is provided on a detent component that is held so as to be elastically displaceable on the limiter disk.

18. The rotation limitation module as claimed in claim 15, wherein, when viewed in a radial direction, a first axial spacing between the housing portion, which supports the first detent geometry, and the limiter disk, and a second axial spacing between the housing portion, which supports the second detent geometry, and the limiter disk in cumulative terms are greater than or equal to 1.5 times a pitch of the external thread of the limiter disk.

19. The rotation limitation module as claimed in claim 15, wherein an axial end side of the housing portion that supports the second detent geometry, at least in portions is covered by an elastically deformable shock-absorbent material.

20. The rotation limitation module as claimed in claim 15, wherein the housing portion that supports the second detent geometry is a housing lid that axially closes the housing.

* * * * *